(12) United States Patent
Yuan

(10) Patent No.: US 10,015,135 B2
(45) Date of Patent: Jul. 3, 2018

(54) APPARATUS, METHOD, AND CLIENT FOR SYNCHRONIZING JUMP CONTEXT

(71) Applicant: TENCENT TECHNOLOGY (SHENZHEN) COMPANY LIMITED, Shenzhen, Guangdong (CN)

(72) Inventor: Changwen Yuan, Shenzhen (CN)

(73) Assignee: Tencent Technology (Shenzhen) Company Limited, Shenzhen, Guangdong (CN)

( * ) Notice: Subject to any disclaimer, the term of this patent is extended or adjusted under 35 U.S.C. 154(b) by 212 days.

(21) Appl. No.: 15/175,357

(22) Filed: Jun. 7, 2016

(65) Prior Publication Data
US 2016/0294771 A1 Oct. 6, 2016

Related U.S. Application Data

(63) Continuation of application No. PCT/CN2015/071324, filed on Jan. 22, 2015.

(30) Foreign Application Priority Data

Jan. 22, 2014 (CN) .......................... 2014 1 0030500

(51) Int. Cl.
*G06F 15/16* (2006.01)
*H04L 29/12* (2006.01)
(Continued)

(52) U.S. Cl.
CPC ......... *H04L 61/6072* (2013.01); *G06Q 50/01* (2013.01); *H04L 61/2596* (2013.01); *H04L 67/20* (2013.01)

(58) Field of Classification Search
CPC ........... H04L 29/08072; H04L 12/1822; H04L 18/31; H04L 29/06; H04N 5/76
(Continued)

(56) References Cited

U.S. PATENT DOCUMENTS 7,818,770 B2 * 10/2010 Ducheneaut ............. H04N 5/76
348/14.01
7,818,771 B2 * 10/2010 Ducheneaut ............. H04N 7/15
348/14.01
(Continued)

FOREIGN PATENT DOCUMENTS

| CN | 101548292 A | 9/2009 |
| CN | 102360480 A | 2/2012 |
| CN | 103038791 A | 4/2013 |

OTHER PUBLICATIONS

OAuth 2.0 http://oauth.net/2/ Web.
(Continued)

*Primary Examiner* — Khanh Dinh
(74) *Attorney, Agent, or Firm* — Harness, Dickey & Pierce, P.L.C.

(57) ABSTRACT

An apparatus, a method, and a client for synchronizing a jump context, such as for synchronizing a jump context of a social application platform to a third-party website, are provided. The apparatus includes a session ID generating module configured to acquire a jump context of a user from a social application platform, save the jump context to a session data DB, and return an ID of the jump context to the social application platform. The apparatus also includes a session data acquiring API configured to acquire the ID of the jump context from a third-party website, acquire the corresponding jump context from the session data DB according to the ID, and feed back the jump context to the third-party website. The session data DB is configured to save the jump context and the ID corresponding to the jump context.

16 Claims, 6 Drawing Sheets

(51) Int. Cl.
*G06Q 50/00* (2012.01)
*H04L 29/08* (2006.01)

(58) Field of Classification Search
USPC .............. 709/220, 223, 224, 232; 455/404.2
See application file for complete search history.

(56) References Cited

U.S. PATENT DOCUMENTS

| | | | | |
|---|---|---|---|---|
| 7,873,983 | B2 * | 1/2011 | Ducheneaut | H04L 12/1822 725/139 |
| 8,295,803 | B2 * | 10/2012 | Jabara | G06Q 10/10 370/338 |
| 2006/0112325 | A1 * | 5/2006 | Ducheneaut | H04L 12/1822 715/203 |
| 2006/0174292 | A1 * | 8/2006 | Ducheneaut | H04N 7/15 725/90 |
| 2006/0174311 | A1 * | 8/2006 | Ducheneaut | H04N 5/76 725/135 |
| 2010/0121735 | A1 | 5/2010 | Shimooka | |
| 2010/0211472 | A1 | 8/2010 | Shimooka | |
| 2011/0246611 | A1 * | 10/2011 | Jabara | G06Q 10/10 709/217 |
| 2014/0379489 | A1 | 12/2014 | Kasai et al. | |

OTHER PUBLICATIONS

International Search Report for Application No. PCT/CN2015/071324 dated May 4, 2015.
International Preliminary Report for Application No. CT/CN2015/071324 dated Jul. 26, 2016.

* cited by examiner

APPARATUS, METHOD, AND CLIENT FOR SYNCHRONIZING JUMP CONTEXT

CROSS-REFERENCE TO RELATED APPLICATIONS

This application is a continuation of International Application No. PCT/CN2015/071324, filed Jan. 22, 2015. This application claims the benefit and priority of Chinese Application No. 201410030500.X, filed Jan. 22, 2014. The entire disclosures of each of the above applications are incorporated herein by reference.

FIELD

The present disclosure relates to the technical field of social applications and to an apparatus, a method, and a client for synchronizing jump context.

BACKGROUND

This section provides background information related to the present disclosure which is not necessarily prior art.

Uniform resource locator (URL) shortening is a technology that consists of mapping a very long link of a website to a very short link to reduce the number of words of a microblog message. This short link is a short URL. The format of the short URL is http://shortdomain/urlid, where shortdomain is a domain name of the short URL, and urlid is an identifier (ID) of the short URL.

A desirable feature of social application platforms, such as microblog, is fast information propagation. This feature is also utilized by a third-party website, such as an e-commerce website, which uses a social application platform to promote its information.

SUMMARY

This section provides a general summary of the disclosure, and is not a comprehensive disclosure of its full scope or all of its features.

The present disclosure provides an apparatus for synchronizing a jump context, which can synchronize a jump context to a third-party website during a jump from a social application platform to the third-party website.

The present disclosure provides a method for synchronizing a jump context, which can synchronize a jump context to a third-party website during a jump from a social application platform to the third-party website.

The technical methods of the present disclosure are implemented as follow.

An apparatus for synchronizing a jump context, comprising one or more processors, and a memory for storing one or more modules to be executed by the one or more processors, wherein the one or more modules comprise a session identifier (ID) generating module, a session data acquiring application interface (API), and a session data database (DB). The session ID generating module acquires a jump context of a user from a social application platform when the user initiates a jump in the social application platform, saves the jump context to a session data DB, acquiring an ID of the jump context, and returns the ID of the jump context to the social application platform, so that the social application platform sends the ID of the jump context to a third-party website when the social application platform detects an instruction for jumping to the third-party website. The session data acquiring API acquires an ID of a jump context from a third-party website, acquires the jump context from the session data DB according to the ID of the jump context, and feeds back the jump context to the third-party website. The session data DB saves the jump context and the ID corresponding to the jump context.

A method for synchronizing a jump context includes:
acquiring a jump context of a user from a social application platform when the user initiates a jump in the social application platform, and saving the jump context;
acquiring an identifier (ID) of the jump context, and returning the ID of the jump context to the social application platform, so that the social application platform sends the ID of the jump context to a third-party website when the social application platform detects an instruction for jumping to the third-party website; and
acquiring an ID of a jump context from the third-party website, acquiring the jump context according to the ID of the jump context, and feeding back the jump context to the third-party website.

A social application platform client for synchronizing a jump context, comprising one or more processors, and a memory for storing one or more modules to be executed by the one or more processors, wherein the one or more modules comprise a jump context collecting module, a jump context reporting module, and an identifier (ID) transferring module. The jump context collecting module collects a jump context of the client when a jump instruction is detected when a user initiates a jump. The jump context reporting module reports the jump context to an apparatus for synchronizing a jump context, so that the apparatus acquires an ID of the jump context, and return the ID of the jump context to the client. The ID transferring module receives the ID of the jump context and sends the ID of the jump context to a third-party website to which a jump is directed, so that the apparatus acquires an ID of a jump context from the third-party website, acquires the jump context according to the ID of the jump context, and feeds back the jump context to the third-party website.

With the apparatus, method, and client for synchronizing a jump context provided in the present disclosure, a jump context when a user jumps from a social application platform is collected and saved, and a corresponding ID is allocated to the jump context. When the user jumps to a third-party website, the third-party website can acquire the corresponding jump context according to the ID.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

Corresponding reference numerals indicate corresponding parts throughout the several views of the drawings.

DETAILED DESCRIPTION

Example embodiments will now be described more fully with reference to the accompanying drawings.

Figure 1:
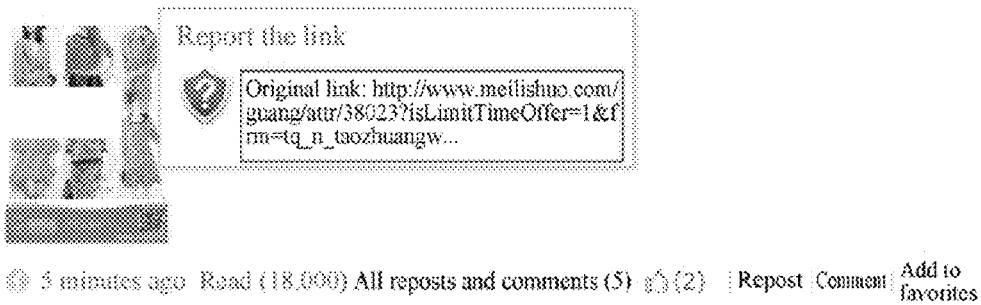
FIG. 1 is a diagram of a microblog message including a short URL in the related art.

When posting a microblog, the third-party website adds a link of information published by the third-party website, which is represented as a short URL in the microblog. When clicking the short URL, a user jumps to a page at which the information is located. In order to make it clear that it is a click from the microblog, a publisher adds a special identification parameter to the end of a long URL. For example, in FIG. 1, an identification parameter frm=tq_n_taozhuangw . . . is added to the end of the long URL of the published message. As can be seen, during jumping, the social application platform can only notify the third-party website that the jump is from the social application platform, and cannot synchronize a jump context to the third-party website. The jump context refers to information, such as a page card of a page of the social application platform that the user browses, an interaction based on a message on the social application platform, or a behavior of implementing a transaction after the user clicks the short URL of the message on the social application platform. A jump action occurs, and the third-party website is jumped to. If the jump context can be acquired, the third-party website can provide a differentiated service for the user according to the jump context. However, the jump context cannot be synchronized to the third-party website yet by using the related art.

Figure 2:
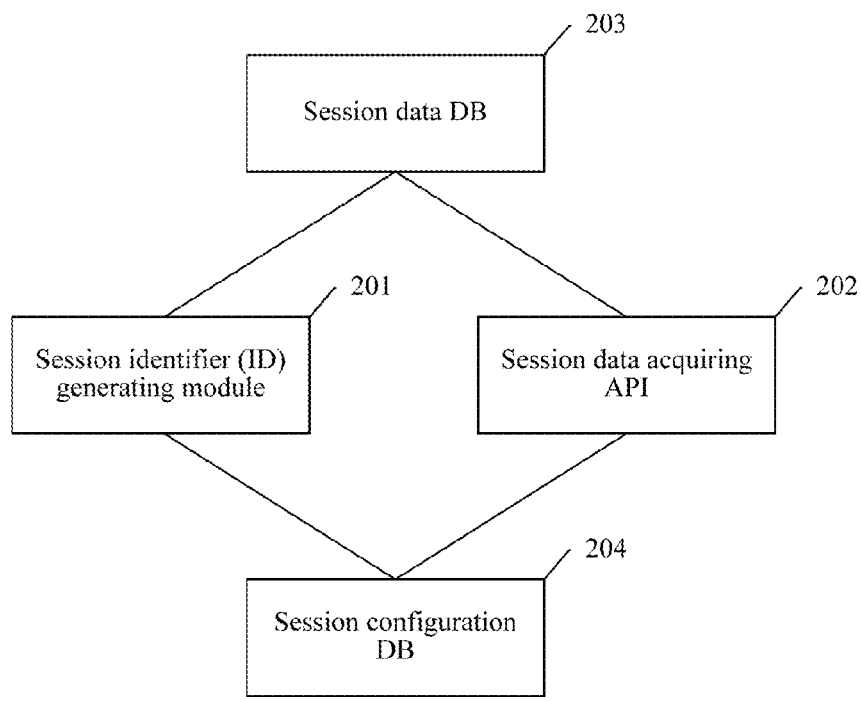
FIG. 2 is a structural diagram of an apparatus for synchronizing a jump context according to various embodiments of the present disclosure.

The present disclosure provides an apparatus for synchronizing a jump context, configured to synchronize a jump context of a social application platform to a third-party website. FIG. 2 is a structural diagram of the apparatus, including:

a session ID generating module 201, configured to acquire a jump context of a user from a social application platform, save the jump context to a session data database (DB) 203, and return an ID of the jump context to the social application platform;

a session data acquiring API 202, configured to acquire the ID of the jump context from the third-party website, acquire the corresponding jump context from the session data DB 203 according to the ID, and feeds back the jump context to the third-party website; and the session data DB 203, configured to save the jump context and the ID corresponding to the jump context.

In the apparatus, the jump context may include at least one of a jump link website address, an ID of a user that initiates a jump, an ID of a page that the user reads when the jump occurs, an ID of a message, an ID of a user that publishes the message, and an ID of a third-party application that publishes the message.

The apparatus may further include:

a session configuration DB 204, configured to receive and save configuration information of a third-party website, where the configuration information includes an ID of a third-party application that enables a session jumping function; and the session ID generating module 201 may be further configured to search the session configuration DB 204 according to the jump context after acquiring the jump context, to determine whether the third-party application that publishes the message and has the ID in the jump context enables a session jumping function, and if yes, save the jump context to the session data DB 203 and return the ID of the jump context to the social application platform.

In the apparatus, a manner for the session ID generating module 201 to save the jump context to the session data DB 203 and return the ID of the jump context to the social application platform may be searching the session data DB 203 to determine whether historical data corresponding to the jump context exists, and if yes, covering the historical data by using the jump context and returning the ID of the jump context to the social application platform. If not, generating a corresponding ID for the jump context, returning the ID of the jump context to the social application platform, and saving the jump context and the ID of the jump context to the session data DB 203.

In the apparatus, the session data acquiring API 202 may be further configured to synchronously receive transaction state information of the user on the third-party website and save the transaction state information to the session data DB 203.

Description is provided below by using an example in which the social application platform is microblog and the third-party website is an e-commerce website. A product process of the present disclosure is as follows. First, a user has a purchase intention when viewing a microblog message of an e-commerce merchant in a microblog main scenario, and then clicks a link website address (that is, a short URL) to enter an e-commerce website for purchasing. Meanwhile, the microblog main scenario transfers a jump context (hereinafter referred to as a short URL jump context) to a session data DB (hereinafter referred to as a short URL session data DB). Second, the e-commerce website searches the short URL session data DB for the short URL jump context, where the short URL jump context includes a microblog ID of the user that clicks for the jump, an ID of a microblog user that publishes the advertisement message for the e-commerce merchant, and the like. Third, the e-commerce website may guide the user to establish a binding relationship between the microblog ID and an account on the e-commerce website, where after the binding relationship is established, the user does not need to re-log in to the e-commerce website. Fourth, the e-commerce website may provide a commodity recommendation according to a level, an interest, and the like of the microblog user, and reward an author that propagates the advertisement message of the e-commerce merchant with bonus points. Fifth, when the user implements a transaction on the e-commerce website, the e-commerce website may return a transaction state to the short URL session data DB by using an interface, where the short URL session data DB synchronously records the transaction state of the user on the e-commerce website, such as whether a seller delivers a commodity, a delivery process, or whether payment is confirmed. Sixth, the microblog main scenario acquires a transaction state of a user from the short URL session data DB and provides the user with a prompt; and if the entire transaction is completed successfully, a microblog platform may provide the user with a reward and a recommendation for next shopping according to a transaction result.

Various embodiments are illustrated below to introduce processes separately.

Figure 3:
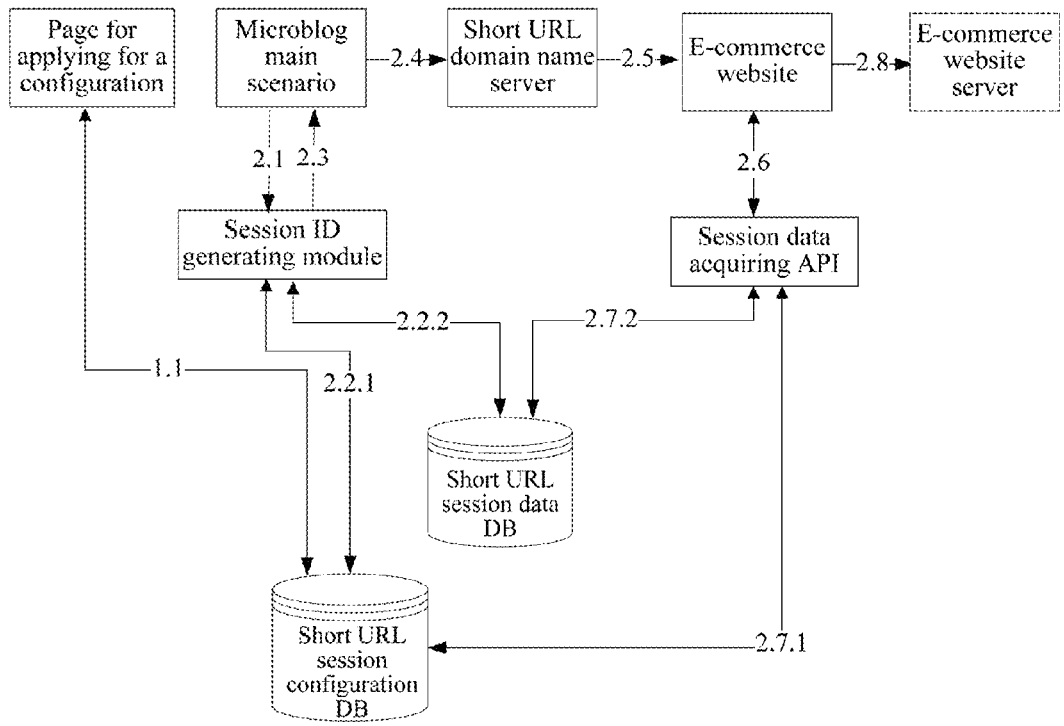
FIG. 3 is a flowchart of implementation of various embodiments.

Various embodiments according to the present disclosure introduce a transfer process of a short URL jump context. FIG. 3 is a flowchart of implementation of various embodiments, including the following.

Block 1.1: If an e-commerce website intends to use a short URL session function, the e-commerce website needs to first apply for the function on a microblog platform, where after the application is passed, a configuration is written to a session configuration DB (hereinafter referred to as a short URL session configuration DB). The short URL session configuration DB saves a right configuration of a short URL session jumping function, may include an ID of a third-party application that enables a short URL session jumping function, and may also include two fields (dwPubAppId, strUrlDomain), where dwPubAppId represents the ID of the third-party application that enables a short URL session jumping function, and strUrlDomain represents a domain name of a short URL.

Block 2.1: When a user clicks a short URL of a jump, a microblog main scenario collects a short URL jump context, including: strShortUrl (the short URL of the jump), dwClickUserId (a microblog ID of a click user), dwPageId (an ID of a page that the user reads when the jump occurs), ddwMsgId (an ID of a microblog message), dwPubUserId (a microblog ID of a user that publishes the message), dwPubAppId (an ID of a third-party application that publishes the microblog message), and the like. The microblog main scenario sends the short URL jump context to a session ID generating module.

Block 2.2.1: The session ID generating module searches the short URL session configuration DB by using dwPubAppId in the short URL jump context, to determine whether the short URL session function is enabled by means of application.

Block 2.2.2 to 2.3: If the short URL session function is enabled by means of application, the session ID generating module searches a short URL session data DB by using two fields, dwClickUserId and strShortUrl, in the short URL jump context, to determine whether corresponding historical data exists, and if yes, covers the existing historical data by using a new short URL jump context and returns an ID (ddwUrlSessionId) of the short URL jump context to the microblog main scenario. If not, writes the short URL jump context to the short URL session data DB, generates a corresponding ID (ddwUrlSessionId) for the short URL jump context, and returns ddwUrlSessionId to the microblog main scenario.

Blocks 2.4 to 2.5: The microblog main scenario adds the received ddwUrlSessionId to the end of a corresponding long URL, and a browser then jumps to a short URL domain name server, and further jumps to the e-commerce website. With these procedures, the e-commerce website acquires the corresponding ID (ddwUrlSessionId) of the short URL jump context.

Block 2.6, block 2.7.1, and block 2.7.2: The e-commerce website sends the acquired ddwUrlSessionId to a session data acquiring API. The session data acquiring API first searches the short URL session configuration DB according to the two fields, dwPubAppId and strUrlDomain, to determine whether the short URL session function is enabled by means of application, and if yes, searches the short URL session data DB for the corresponding short URL jump context according to ddwUrlSessionId and returns the short URL jump context to the e-commerce website.

Block 2.8: The e-commerce website acquires the microblog ID of the click user in the short URL jump context, establishes a binding relationship between the microblog ID of the click user and the e-commerce website, guides the user to purchase if the binding relationship is established, and guides the user to pay if the user purchases a commodity of the URL link but has not made a payment. According to such logic, the e-commerce website can flexibly guide the user according to product requirements of the e-commerce website by using the short URL jump context.

Various embodiments of the present disclosure introduce a manner of synchronizing a processing state of a user on an e-commerce website. When a user makes a purchase on an e-commerce website, transaction state information may be synchronously written to a short URL session data DB by using a session data acquiring API. Processing state information (which may be the transaction state information) may include strGoodsDesc (description information of a purchased commodity), cPurChase (a purchase state), strOrderId (an ID of a logistic order), and the like.

Figure 4:
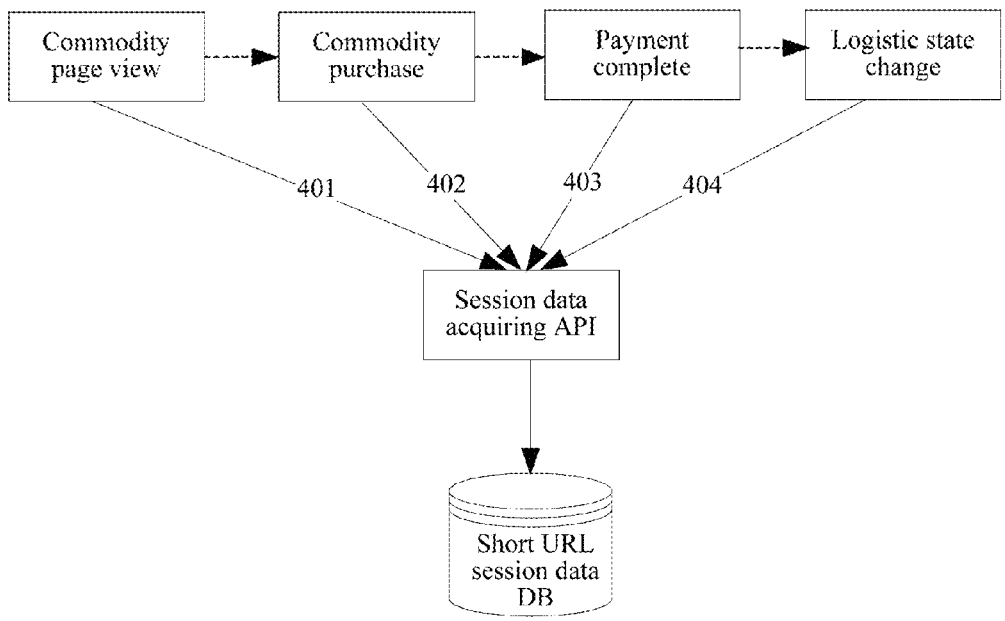
FIG. 4 is a flowchart of implementation of various embodiments.

FIG. 4 shows a process of synchronizing the transaction state information that is introduced in various embodiments, including the following.

Block 401: When a user views a page with detailed information of a commodity and clicks to purchase the commodity, it indicates that the user has a purchase intention. An e-commerce website needs to send transaction state information (for example, the description information of the commodity) along with ddwUrlSessionId to a session data acquiring API. The session data acquiring API checks the legality of ddwUrlSessionId, and writes the transaction state information to a short URL session data DB if ddwUrlSessionId is legal. The short URL session data DB saves a correspondence between the transaction state information and ddwUrlSessionId.

Block 402 to 404: A purchase process. In each portion of the purchase, the e-commerce website needs to send the transaction state information to the session data acquiring API, and the session data acquiring API writes the transaction state information to the short URL session data DB.

Figure 5:
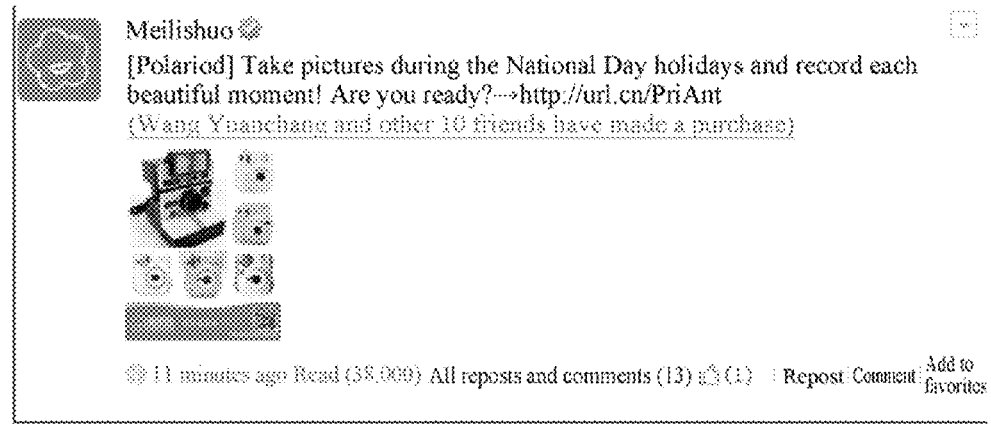
FIG. 5 is a diagram of a first display manner of various embodiments.

Various embodiments of the present disclosure introduce a manner for a microblog main scenario to display processing state information (for example, transaction state information), mainly including the following two display manners:

First manner: Relevant transaction state information of a contact of a current user is displayed in a microblog message. As shown in FIG. 5, friends that purchase the commodity may be displayed.

Figure 6:
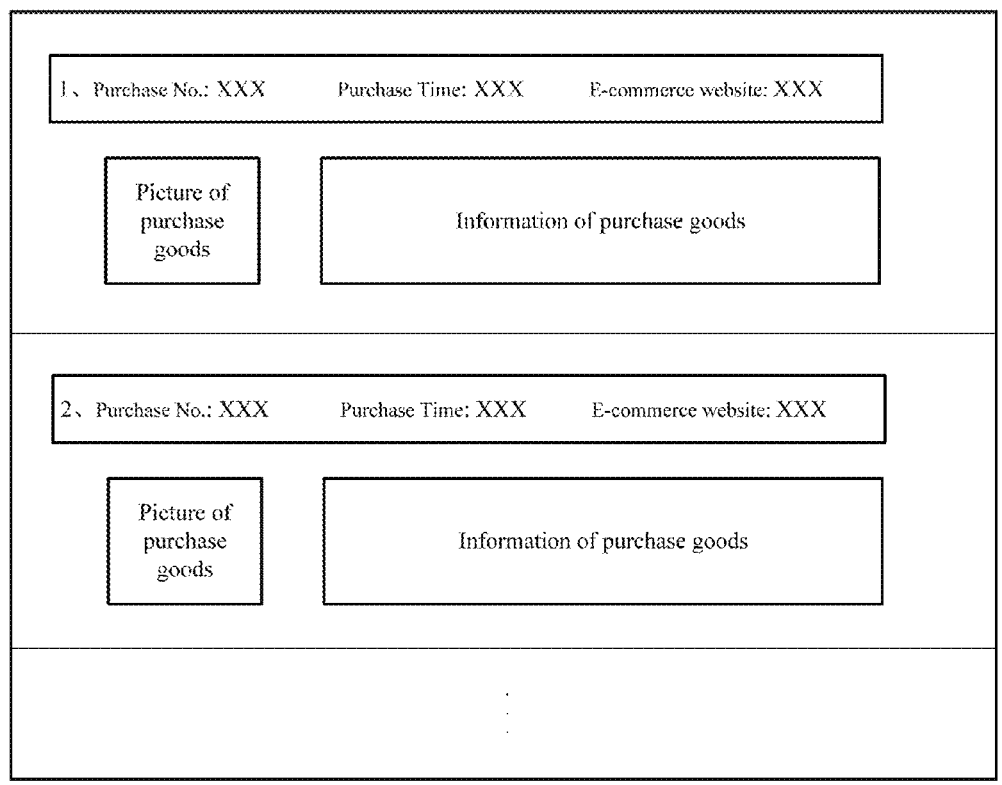
FIG. 6 is a diagram of a second display manner of various embodiments.

Second manner: More than one piece of transaction state information of a transaction implemented by a current user is collected and displayed in the form of a list for each user to view a purchase list of the user, as shown in FIG. 6.

By means of the two foregoing display manners, the user can view from microblog a message link of the e-commerce website, can still trace the entire purchase process in a microblog scenario after the purchase is made, and provides purchase guidance for friends. Further, when the purchase state information changes, the microblog user may be notified in a plurality of forms, such as a private message or a notification. The user can trace the entire purchase process in the microblog scenario. The manner of notifying the user may be diversified.

Figure 7:
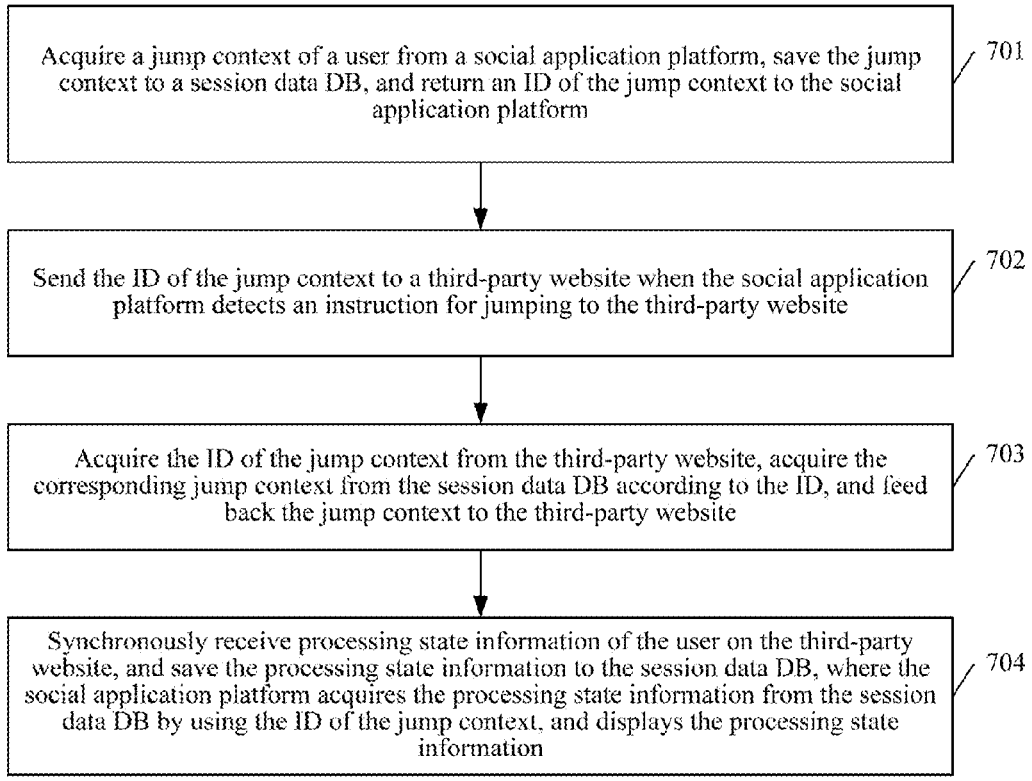
FIG. 7 is a flowchart of implementation of a method for synchronizing a jump context according to various embodiments.

The present disclosure further provides a method for synchronizing a short URL jump context by using the foregoing apparatus. FIG. 7 is a flowchart of implementation of the method.

Block 701: Acquire a jump context of a user from a social application platform, save the jump context to a session data DB, and return an ID of the jump context to the social application platform.

Block 702: Send the ID of the jump context to a third-party website when the social application platform detects an instruction for jumping to the third-party website.

Block 703: Acquire the ID of the jump context from a third-party website, acquire the corresponding jump context from the session data DB according to the ID, and feed back the jump context to the third-party website. In the method, the jump context may include at least one of a jump link website address, an ID of a user that initiates a jump, an ID of a page that the user reads when the jump occurs, an ID of a message, an ID of a user that publishes the message, and an ID of a third-party application that publishes the message.

Before block 701, the method may further include receiving and saving, by a session configuration DB, configuration information of a third-party website, where the configuration information includes an ID of a third-party application that enables a session jumping function. In block 701, after the acquiring a jump context of a user from a social application platform and before the saving the jump context to a session data DB, the method may further include searching the session configuration DB according to the jump context, to determine whether the third-party application that publishes the message and has the ID in the jump context enables a session jumping function, and if yes, continue to perform the procedure of saving the jump context to a session data DB.

In block 701, a manner of saving the jump context to a session data DB and returning an ID of the jump context to the social application platform by a session ID generating module may be searching the session data DB to determine whether historical data corresponding to the jump context exists, and if yes, covering the historical data by using the jump context and returning the ID of the jump context to the social application platform. If not, generating a corresponding ID for the jump context, returning the ID of the jump context to the social application platform, and saving the jump context and the ID of the jump context to the session data DB.

The method may further include the following.

Block 704: Synchronously receive processing state information of the user on the third-party website, save the processing state information to the session data DB, where the social application platform acquires the processing state information from the session data DB by using the ID of the jump context, and display the processing state information. A manner for the social application platform to display the processing state information may be displaying, in a message of the social application platform, relevant processing state information of a contact of the current user, or displaying more than one piece of processing state information of the current user in a form of a list.

In block 702, a manner of sending the ID of the jump context to a third-party website when the social application platform detects an instruction for jumping to the third-party website may be:

adding the ID of the jump context to the end of a corresponding long URL; or encrypting the ID of the jump context and adding the encrypted information to the end of a corresponding long URL.

Figure 8:
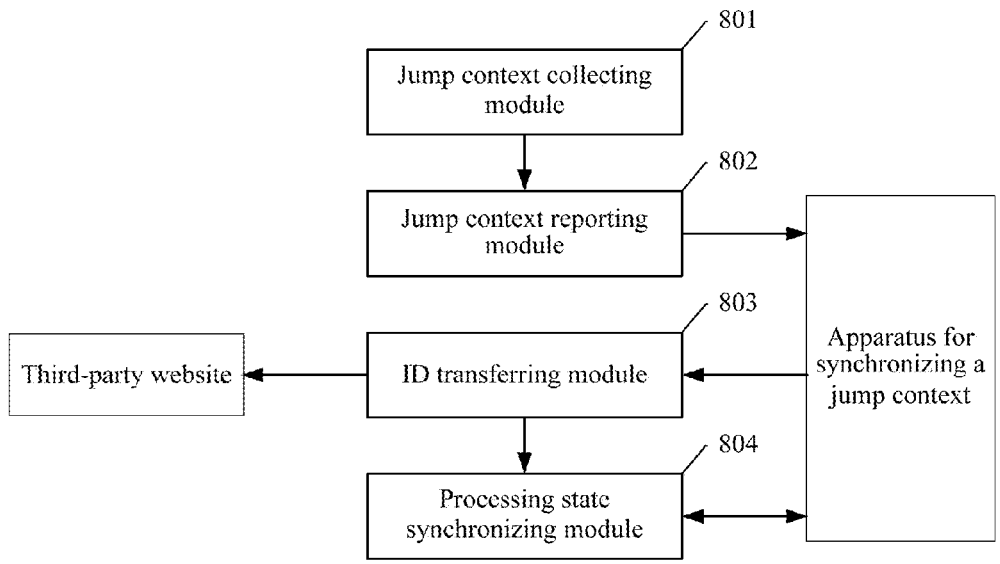
FIG. 8 is a structural diagram of a social application platform client for synchronizing a jump context according to various embodiments.

The present disclosure further provides a social application platform client for synchronizing a jump context. FIG. 8 is a structural diagram of the client, including:

a jump context collecting module 801, configured to collect a jump context of the client when a jump instruction is detected;

a jump context reporting module 802, configured to report the jump context; and an ID transferring module 803, configured to receive an ID of the jump context and send the ID of the jump context to a third-party website to which a jump is directed.

In the client, the jump context may include at least one of a jump link website address, an ID of a user that initiates a jump, an ID of a page that the user reads when the jump occurs, an ID of a message, an ID of a user that publishes the message, and an ID of a third-party application that publishes the message. The client may further include a processing state synchronizing module 804, configured to acquire corresponding processing state information by using the ID of the jump context, and display the processing state information.

Figure 9:
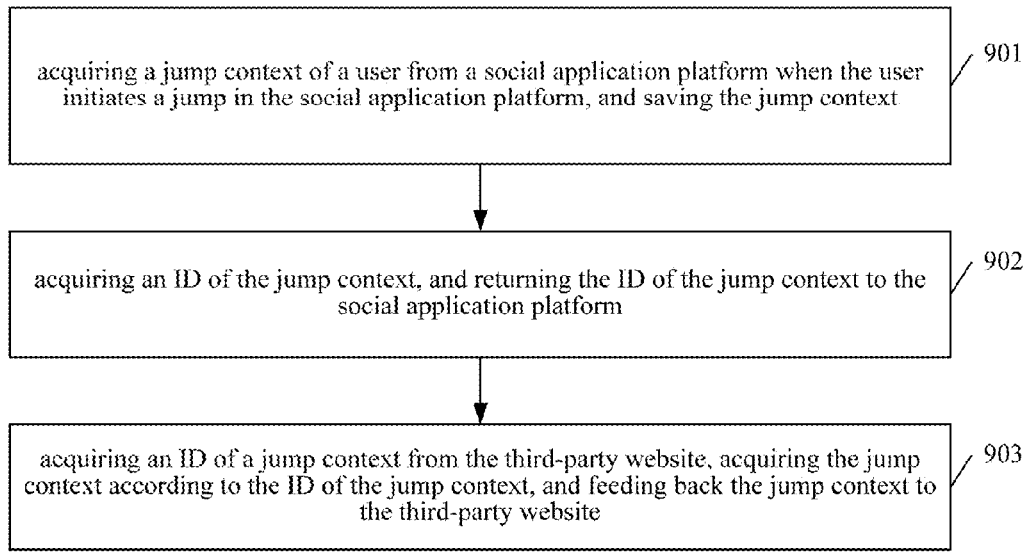
FIG. 9 is a flowchart of implementation of another method for synchronizing a jump context according to various embodiments.

FIG. 9 is a flowchart of implementation of another method for synchronizing a jump context according to various embodiments of the present disclosure, including the following.

Block 901: Acquiring a jump context of a user from a social application platform when the user initiates a jump in the social application platform, and saving the jump context.

Block 902: Acquiring an ID of the jump context, and returning the ID of the jump context to the social application platform, so that the social application platform sends the ID of the jump context to a third-party website when the social application platform detects an instruction for jumping to the third-party website.

Block 903: Acquiring an ID of a jump context from the third-party website, acquiring the jump context according to the ID of the jump context, and feeding back the jump context to the third-party website.

According to various embodiments, the method may further comprise receiving and saving configuration information of a third-party website, wherein the configuration information comprises an ID of a third-party application that enables a session jumping function, and wherein the jump context includes an ID of a third-party application, saving the jump context comprises: according to an ID of a third-party application included in the jump context, and determining whether the third-party application enables a session jumping function When it is determined that the third-party application enables a session jumping function, saving the jump context.

In the method, acquiring the ID of the jump context and returning the ID of the jump context to the social application platform may comprise determining whether historical data corresponding to the jump context exists, and if yes, covering the historical data by using the jump context, finding the ID of the jump context in the historical data, and returning the ID of the jump context to the social application platform. If not, generating the ID of the jump context, returning the ID of the jump context to the social application platform, and saving the jump context and the ID of the jump context.

According to various embodiments, the method may further comprise synchronously receiving processing state information of the user on the third-party website and saving the processing state information; sending the processing state information to the social application platform by using the ID of the jump context, so that the social application platform displays the processing state information.

The social application platform displays the processing state information and may comprise displaying, in a message of the social application platform, relevant processing state information of a contact of a current user, or displaying more than one piece of processing state information of a current user in a form of a list. In the method, the social application platform sends the ID of the jump context to the third-party website when the social application platform detects an instruction for jumping to the third-party website and may comprise adding the ID of the jump context to the end of a long Uniform Resource Locator (URL) corresponding to the jump context, and sending the long URL to the third-party website; or encrypting the ID of the jump context and adding the encrypted information to the end of a long URL corresponding to the jump context, and sending the long URL to the third-party website.

According to various embodiments, the method may further comprise receiving and saving configuration information of a third-party website, wherein the configuration information comprises an ID of a third-party application that enables a session jumping function, and wherein acquiring the ID of the jump context from the third-party website, acquiring the jump context corresponding to the ID of the jump context comprises, according to the ID of the third-party application and the configuration information, determining whether the third-party application enables a session jumping function. When it is determined that the third-party application enables a session jumping function, acquiring the jump context corresponding to the ID of the jump context.

Figure 10:
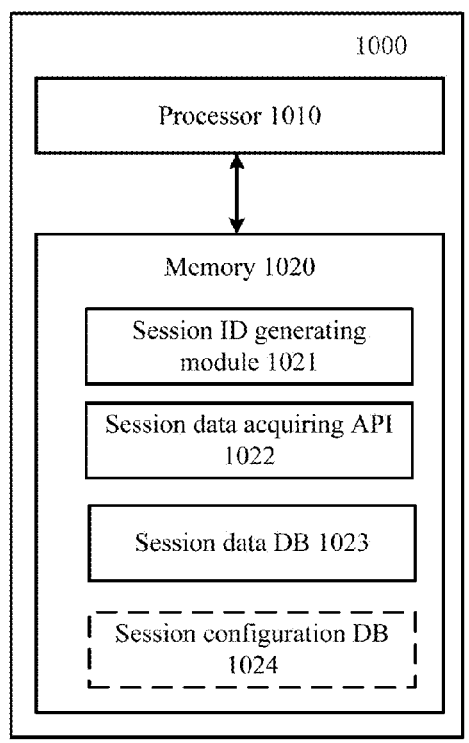
FIG. 10 is a structural diagram of another apparatus for synchronizing a jump context according to various embodiments.

FIG. 10 is a structural diagram of another apparatus for synchronizing a jump context according to various embodiments of the present disclosure. The apparatus 1000 comprises one or more processors 1010 and a memory 1020 for storing one or more modules to be executed by the one or more processors, wherein the one or more modules comprise a session identifier (ID) generating module 1021, a session data acquiring application interface (API) 1022, and a session data DB 1023.

The session ID generating module 1021 acquires a jump context of a user from a social application platform when the user initiates a jump in the social application platform, saves the jump context to a session data DB 1023, acquiring an ID of the jump context, and returns the ID of the jump context to the social application platform, so that the social application platform sends the ID of the jump context to a third-party website when the social application platform detects an instruction for jumping to the third-party website;

The session data acquiring API 1022 acquires an ID of a jump context from a third-party website, acquires the jump context from the session data DB 1023 according to the ID of the jump context, and feeds back the jump context to the third-party website. The session data DB 1023 saves the jump context and the ID corresponding to the jump context.

According to various embodiments, the one or more modules may further comprise a session configuration DB 1024. The session configuration DB 1024 receives and saves configuration information of a third-party website, wherein the configuration information comprises an ID of a third-party application that enables a session jumping function, wherein the jump context includes an ID of a third-party application. The session ID generating module 1021, according to an ID of a third-party application included in the jump context and the configuration information in the session configuration DB 1024, determines whether the third-party application enables a session jumping function, and when it is determined that the third-party application enables a session jumping function, saves the jump context to the session data DB 1023.

According to various embodiments, the session ID generating module 1021 searches the session data DB 1023 to determine whether historical data corresponding to the jump context exists, and if yes, cover the historical data by using the jump context, finds the ID of the jump context in the historical data, and returns the ID of the jump context to the social application platform. If not, generates the ID of the jump context, returns the ID of the jump context to the social application platform, and saves the jump context and the ID of the jump context to the session data DB 1023.

According to various embodiments, the session data acquiring API 1022 further synchronously receives transaction state information of the user on the third-party website and saves the transaction state information to the session data DB 1023, and sends the processing state information to the social application platform by using the ID of the jump context, so that the social application platform displays the processing state information.

Figure 11:
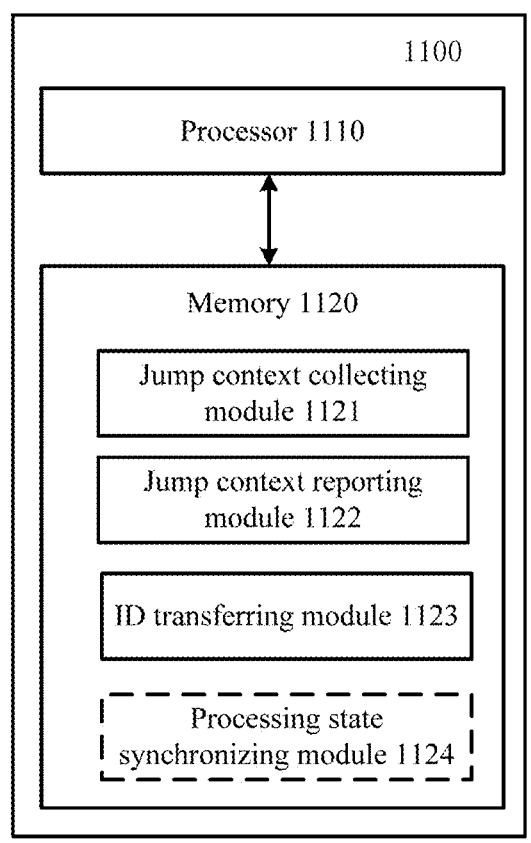
FIG. 11 is a structural diagram of another social application platform client for synchronizing a jump context according to various embodiments.

FIG. 11 is a structural diagram of another social application platform client for synchronizing a jump context according to various embodiments of the present disclosure. The social application platform client 1100 comprises one or more processors 1110 and a memory 1120 for storing one or more modules to be executed by the one or more processors, wherein the one or more modules comprise a jump context collecting module 1121, a jump context reporting module 1122, and an identifier (ID) transferring module 1123. The jump context collecting module 1121 collects a jump context of the client when a jump instruction is detected when a user initiates a jump The jump context reporting module 1122 reports the jump context to an apparatus for synchronizing a jump context, so that the apparatus acquires an ID of the jump context, and return the ID of the jump context to the client. The ID transferring module 1123 receives the ID of the jump context and sends the ID of the jump context to a third-party website to which a jump is directed, so that the apparatus acquires an ID of a jump context from the third-party website, acquires the jump context according to the ID of the jump context, and feeds back the jump context to the third-party website.

According to various embodiments, the one or more modules may further comprise a processing state synchronizing module 1124. The processing state synchronizing module 1124 acquires processing state information from the apparatus by using the ID of the jump context and displays the processing state information.

With the apparatus, method, and client for synchronizing a jump context provided in the present disclosure, a jump to an e-commerce website is performed by using a short URL in a microblog scenario, and the e-commerce website can acquire jump context information of a user through a secure channel, thereby solving the issue of securely transferring microblog information to a target website after the jump is performed by using the short URL. After the jump to the e-commerce website is performed by using the short URL, the e-commerce website can synchronize a progress of a transaction and result information of the transaction to a microblog platform, and the microblog platform presents the progress of the transaction and the result information of the transaction, reminds the user of the progress of the transaction and the result information of the transaction, provides the user with a reward according to the transaction result, and the like, thereby solving the issue that the microblog platform is disconnected from an e-commerce platform after the jump is performed from the microblog platform to the e-commerce website.

The foregoing descriptions are merely preferred embodiments of the present disclosure, but are not intended to limit the present disclosure. Any modification, equivalent replacement, or improvement made within the spirit and principle of the present disclosure shall fall within the protection scope of the present disclosure.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

The foregoing description is merely illustrative in nature and is in no way intended to limit the disclosure, its application, or uses. The broad teachings of the disclosure can be implemented in a variety of forms. Therefore, while this disclosure includes particular examples, the true scope of the disclosure should not be so limited since other modifications will become apparent upon a study of the drawings, the specification, and the following claims. It should be understood that one or more steps within a method may be executed in different order (or concurrently) without altering the principles of the present disclosure. Further, although each of the embodiments is described above as having certain features, any one or more of those features described with respect to any embodiment of the disclosure can be implemented in and/or combined with features of any of the other embodiments, even if that combination is not explicitly described. In other words, the described embodiments are not mutually exclusive, and permutations of one or more embodiments with one another remain within the scope of this disclosure.

Spatial and functional relationships between elements (for example, between modules, circuit elements, semiconductor layers, etc.) are described using various terms, including "connected," "engaged," "coupled," "adjacent," "next to," "on top of," "above," "below," and "disposed." Unless explicitly described as being "direct," when a relationship between first and second elements is described in the above disclosure, that relationship can be a direct relationship where no other intervening elements are present between the first and second elements, but can also be an indirect relationship where one or more intervening elements are present (either spatially or functionally) between the first and second elements. As used herein, the phrase at least one of A, B, and C should be construed to mean a logical (A OR B OR C), using a non-exclusive logical OR, and should not be construed to mean "at least one of A, at least one of B, and at least one of C."

In the figures, the direction of an arrow, as indicated by the arrowhead, generally demonstrates the flow of information (such as data or instructions) that is of interest to the illustration. For example, when element A and element B exchange a variety of information but information transmitted from element A to element B is relevant to the illustration, the arrow may point from element A to element B. This unidirectional arrow does not imply that no other information is transmitted from element B to element A. Further, for information sent from element A to element B, element B may send requests for, or receipt acknowledgements of, the information to element A.

In this application, including the definitions below, the term "module" or the term "controller" may be replaced with the term "circuit." The term "module" may refer to, be part of, or include: an Application Specific Integrated Circuit (ASIC); a digital, analog, or mixed analog/digital discrete circuit; a digital, analog, or mixed analog/digital integrated circuit; a combinational logic circuit; a field programmable gate array (FPGA); a processor circuit (shared, dedicated, or group) that executes code; a memory circuit (shared, dedicated, or group) that stores code executed by the processor circuit; other suitable hardware components that provide the described functionality; or a combination of some or all of the above, such as in a system-on-chip.

The module may include one or more interface circuits. In some examples, the interface circuits may include wired or wireless interfaces that are connected to a local area network (LAN), the Internet, a wide area network (WAN), or combinations thereof. The functionality of any given module of the present disclosure may be distributed among multiple modules that are connected via interface circuits. For example, multiple modules may allow load balancing. In a further example, a server (also known as remote, or cloud) module may accomplish some functionality on behalf of a client module.

The term code, as used above, may include software, firmware, and/or microcode, and may refer to programs, routines, functions, classes, data structures, and/or objects. The term shared processor circuit encompasses a single processor circuit that executes some or all code from multiple modules. The term group processor circuit encompasses a processor circuit that, in combination with additional processor circuits, executes some or all code from one or more modules. References to multiple processor circuits encompass multiple processor circuits on discrete dies, multiple processor circuits on a single die, multiple cores of a single processor circuit, multiple threads of a single processor circuit, or a combination of the above. The term shared memory circuit encompasses a single memory circuit that stores some or all code from multiple modules. The term group memory circuit encompasses a memory circuit that, in combination with additional memories, stores some or all code from one or more modules.

The term memory circuit is a subset of the term computer-readable medium. The term computer-readable medium, as used herein, does not encompass transitory electrical or electromagnetic signals propagating through a medium (such as on a carrier wave); the term computer-readable medium may therefore be considered tangible and non-transitory. Non-limiting examples of a non-transitory, tangible computer-readable medium are nonvolatile memory circuits (such as a flash memory circuit, an erasable programmable read-only memory circuit, or a mask read-only memory circuit), volatile memory circuits (such as a static random access memory circuit or a dynamic random access memory circuit), magnetic storage media (such as an analog or digital magnetic tape or a hard disk drive), and optical storage media (such as a CD, a DVD, or a Blu-ray Disc).

The apparatuses and methods described in this application may be partially or fully implemented by a special purpose computer created by configuring a general purpose computer to execute one or more particular functions embodied in computer programs. The functional blocks and flowchart elements described above serve as software specifications, which can be translated into the computer programs by the routine work of a skilled technician or programmer.

The computer programs include processor-executable instructions that are stored on at least one non-transitory, tangible computer-readable medium. The computer programs may also include or rely on stored data. The computer programs may encompass a basic input/output system (BIOS) that interacts with hardware of the special purpose computer, device drivers that interact with particular devices of the special purpose computer, one or more operating systems, user applications, background services, background applications, etc.

The computer programs may include: (i) descriptive text to be parsed, such as HTML (hypertext markup language) or XML (extensible markup language), (ii) assembly code, (iii) object code generated from source code by a compiler, (iv) source code for execution by an interpreter, (v) source code for compilation and execution by a just-in-time compiler, etc. As examples only, source code may be written using syntax from languages including C, C++, C#, Objective-C, Swift, Haskell, Go, SQL, R, Lisp, Java®, Fortran, Perl, Pascal, Curl, OCaml, Javascript®, HTML5 (Hypertext Markup Language 5th revision), Ada, ASP (Active Server Pages), PHP (PHP: Hypertext Preprocessor), Scala, Eiffel, Smalltalk, Erlang, Ruby, Flash®, Visual Basic®, Lua, MAT-LAB, SIMULINK, and Python®.

None of the elements recited in the claims are intended to be a means-plus-function element within the meaning of 35 U.S.C. § 112(f) unless an element is expressly recited using the phrase "means for," or in the case of a method claim using the phrases "operation for" or "step for."

What is claimed is:

1. An apparatus for synchronizing a jump context, comprising one or more processors, and a memory for storing one or more modules to be executed by the one or more processors, wherein the one or more modules comprise a session identifier (ID) generating module, a session data acquiring application interface (API), and a session data database (DB), the session ID generating module acquires a jump context of a user from a social application platform when the user initiates a jump in the social application platform, saves the jump context to a session data DB, acquires an ID of the jump context, and returns the ID of the jump context to the social application platform, so that the social application platform sends the ID of the jump context to a third-party website when the social application platform detects an instruction for jumping to the third-party website;

the session data acquiring API acquires an ID of a jump context from a third-party website, acquires the jump context from the session data DB according to the ID of the jump context, and feeds back the jump context to the third-party website; and the session data DB saves the jump context and the ID corresponding to the jump context.

2. The apparatus according to claim 1, wherein the jump context comprises: at least one of a jump link website address, an ID of a user that initiates a jump, an ID of a page that the user reads when the jump occurs, an ID of a message, an ID of a user that publishes the message, and an ID of a third-party application that publishes the message.

3. The apparatus according to claim 1, wherein the one or more modules further comprises a session configuration DB,
the session configuration DB receives and save configuration information of a third-party website, wherein the configuration information comprises an ID of a third-party application that enables a session jumping function; and wherein the jump context includes an ID of a third-party application, the session ID generating module, according to an ID of a third-party application included in the jump context and the configuration information, determines whether the third-party application enables a session jumping function, and when it is determined that the third-party application enables a session jumping function, saves the jump context to the session data DB.

4. The apparatus according to claim 1, wherein the session ID generating module searches the session data DB to determine whether historical data corresponding to the jump context exists, and if yes, covers the historical data by using the jump context, finds the ID of the jump context in the historical data and returns the ID of the jump context to the social application platform; and if not, generates the ID of the jump context, returns the ID of the jump context to the social application platform, and saves the jump context and the ID of the jump context to the session data DB.

5. The apparatus according to claim 1, wherein the session data acquiring API further synchronously receives transaction state information of the user on the third-party website and saves the transaction state information to the session data DB, sends the processing state information to the social application platform by using the ID of the jump context, so that the social application platform displays the processing state information.

6. A method for synchronizing a jump context, comprising:

acquiring a jump context of a user from a social application platform when the user initiates a jump in the social application platform, and saving the jump context;

acquiring an identifier (ID) of the jump context, and returning the ID of the jump context to the social application platform, so that the social application platform sends the ID of the jump context to a third-party website when the social application platform detects an instruction for jumping to the third-party website; and acquiring an ID of a jump context from the third-party website, acquiring the jump context according to the ID of the jump context, and feeding back the jump context to the third-party website.

7. The method according to claim 6, wherein the jump context comprises: at least one of a jump link website address, an ID of a user that initiates a jump, an ID of a page that the user reads when the jump occurs, an ID of a message, an ID of a user that publishes the message, and an ID of a third-party application that publishes the message.

8. The method according to claim 6, further comprising: receiving and saving configuration information of a third-party website, wherein the configuration information comprises an ID of a third-party application that enables a session jumping function; and wherein the jump context includes an ID of a third-party application, saving the jump context comprises:

according to an ID of a third-party application included in the jump context, determining whether the third-party application enables a session jumping function;

when it is determined that the third-party application enables a session jumping function, saving the jump context.

9. The method according to claim 6, wherein acquiring the ID of the jump context and returning the ID of the jump context to the social application platform comprises:
    determining whether historical data corresponding to the jump context exists, and if yes, covering the historical data by using the jump context, finding the ID of the jump context in the historical data and returning the ID of the jump context to the social application platform; and if not, generating the ID of the jump context, returning the ID of the jump context to the social application platform, and saving the jump context and the ID of the jump context.

10. The method according to claim 6, further comprising:
    synchronously receiving processing state information of the user on the third-party website and saving the processing state information;
    sending the processing state information to the social application platform by using the ID of the jump context, so that the social application platform displays the processing state information.

11. The method according to claim 10, wherein the social application platform displays the processing state information comprises:
    displaying, in a message of the social application platform, relevant processing state information of a contact of a current user, or displaying more than one piece of processing state information of a current user in a form of a list.

12. The method according to claim 6, wherein the social application platform sends the ID of the jump context to the third-party website when the social application platform detects an instruction for jumping to the third-party website comprises:
    adding the ID of the jump context to the end of a long Uniform Resource Locator (URL) corresponding to the jump context, and sending the long URL to the third-party website; or
    encrypting the ID of the jump context and adding the encrypted information to the end of a long URL corresponding to the jump context, and sending the long URL to the third-party website.

13. The method according to claim 6, further comprising:
    receiving and saving configuration information of a third-party website, wherein the configuration information comprises an ID of a third-party application that enables a session jumping function; and
    wherein acquiring the ID of the jump context from the third-party website, acquiring the jump context corresponding to the ID of the jump context comprises:
    according to the ID of the third-party application and the configuration information, determining whether the third-party application enables a session jumping function;
    when it is determined that the third-party application enables a session jumping function, acquiring the jump context corresponding to the ID of the jump context.

14. A social application platform client for synchronizing a jump context, comprising one or more processors, and a memory for storing one or more modules to be executed by the one or more processors, wherein the one or more modules comprise a jump context collecting module, a jump context reporting module, and an identifier (ID) transferring module,
    the jump context collecting module collects a jump context of the client when a jump instruction is detected when a user initiates a jump;
    the jump context reporting module reports the jump context to an apparatus for synchronizing a jump context, so that the apparatus acquires an ID of the jump context, and returns the ID of the jump context to the client; and
    the ID transferring module receives the ID of the jump context and sends the ID of the jump context to a third-party website to which a jump is directed, so that the apparatus acquires an ID of a jump context from the third-party website, acquires the jump context according to the ID of the jump context, and feeds back the jump context to the third-party website.

15. The client according to claim 14, wherein the jump context comprises: at least one of a jump link website address, an ID of a user that initiates a jump, an ID of a page that the user reads when the jump occurs, an ID of a message, an ID of a user that publishes the message, and an ID of a third-party application that publishes the message.

16. The client according to claim 14, wherein the one or more modules further comprises a processing state synchronizing module,
    the processing state synchronizing module acquires processing state information from the apparatus by using the ID of the jump context, and displays the processing state information.

* * * * *